April 8, 1969    M. HUNGERFORD    3,437,165
HOOD AND BATTERY HOLDER FOR TRACTOR
Filed March 23, 1967    Sheet 1 of 3
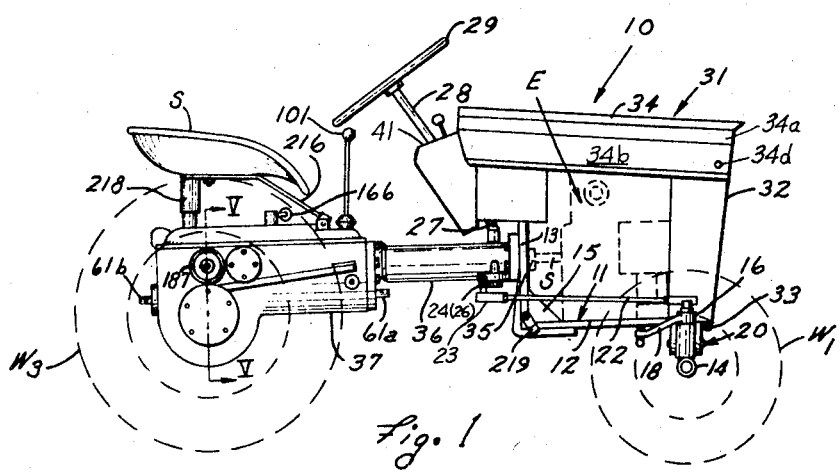
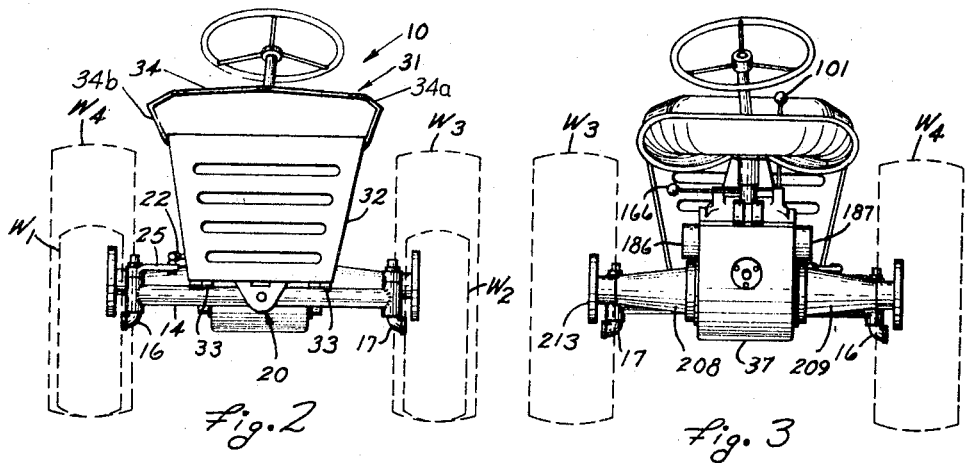
INVENTOR.
MAX HUNGERFORD
BY
ATTORNEY

INVENTOR.
MAX HUNGERFORD
BY
ATTORNEY

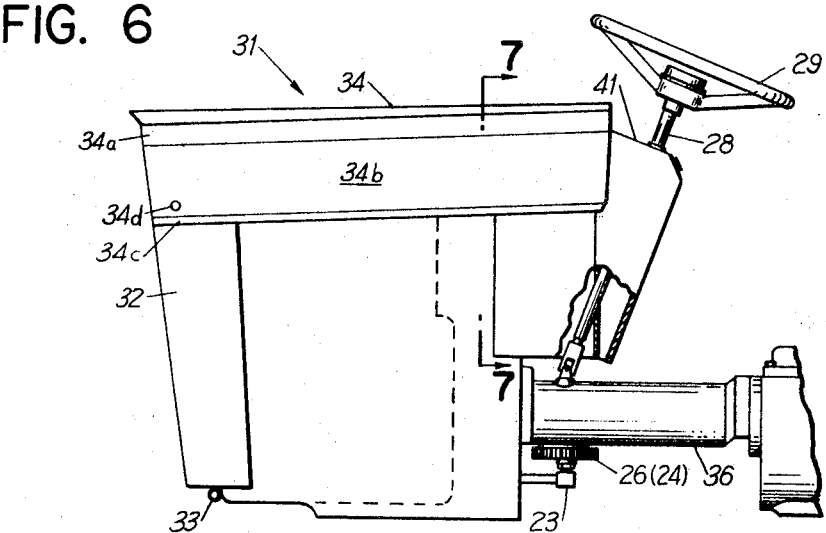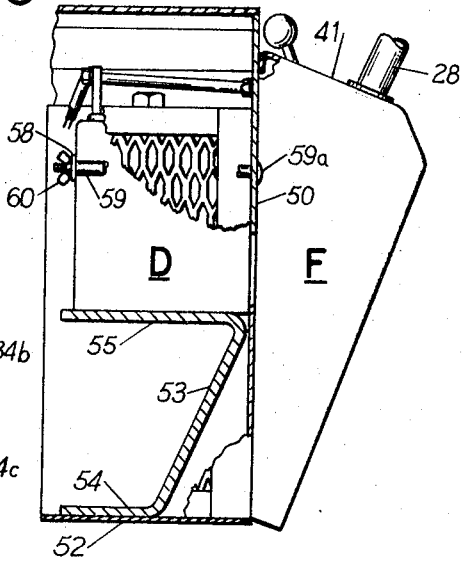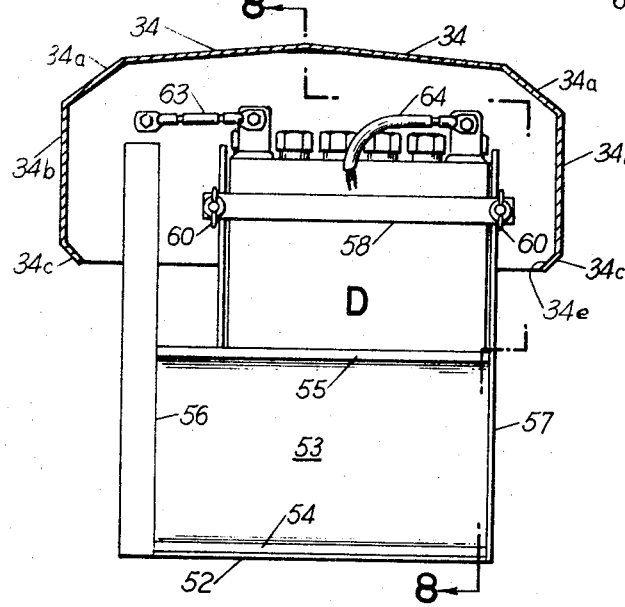

3,437,165
HOOD AND BATTERY HOLDER FOR TRACTOR
Max Hungerford, La Grange, Mich., assignor to American Machine & Foundry Co., a corporation of New Jersey
Filed Mar. 23, 1967, Ser. No. 625,462
Int. Cl. B62d 25/00
U.S. Cl. 180—68.5          5 Claims

ABSTRACT OF THE DISCLOSURE

A structure for mounting and securing a battery in tractors, and particularly in small tractors which are designed for compactness. The battery holder embodies a horizontally disposed channel mounting member in which the lower leg of the channel member is relatively narrow in width for permanent attachment to an element of the tractor body assembly and the other leg of the channel member is of greater width for supporting the battery thereon. The base of the channel structure is inclined in a direction upwardly and rearwardly of the tractor and is connected at its ends to spaced parallel upright panels defining in part a housing, the rear wall of which forms a securing means for the heads of clamp bolts.

---

The object of this invention is to provide a battery holder for garden tractors including a limited number of parts, the main part being the support for the battery which is constructed and arranged to stiffen the tractor assembly and at the same time occupy a limited space.

A further object of the invention is to provide a support for a battery of channel form, the channel including a relatively narrow base flange to be secured to the tractor structure and a relatively wide upper supporting flange upon which a battery is to be mounted, the channel lying on its side and facing toward the front of the tractor providing a compartment for accommodating suitable necessary parts included in the tractor power plant and a passageway for electrical wiring.

These and other objects of the invention will more clearly hereinafter appear by reference to the accompanying drawings forming a part of the instant specification and wherein like characters of reference designate corresponding parts throughout the several views, in which:

FIG. 1 is a side view of the tractor with the ground engaging wheels thereof being shown in broken lines;

FIG. 2 is a front view of the tractor;

FIG. 3 is a rear view of the tractor;

FIG. 6 is an enlarged fragmentary elevation showing the battery mounting structure;

FIG. 7 is a transverse section taken on line 7—7 of FIG. 6; and

FIG. 8 is a section taken on line 8—8 of FIG. 7.

Figure 4:
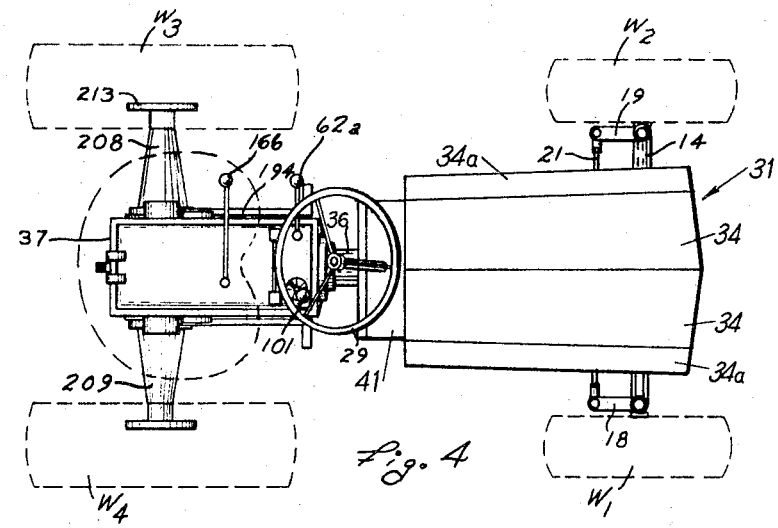
FIG. 4 is a top view of the tractor with the driver's seat not shown.
Figure 5:
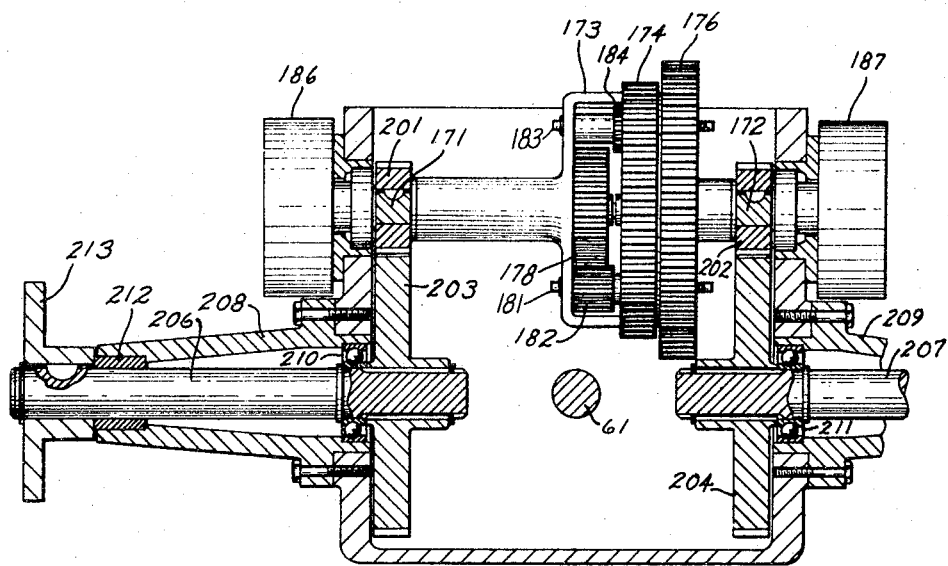
FIG. 5 is a sectional view taken on line 5—5 of FIG. 1, and with the cover of the transmission and axle housing removed.

Referring to the drawings, the tractor 10 is comprised of a substantially L-shaped engine support 11, preferably a cast iron casting, having a substantially horizontal lower wall 12 and an upright wall 13, said walls having stiffening flanges 15 at the juncture thereof. The front axle 14 is pivotally mounted midway between its ends on the front end of wall 12 by a pivot pin and bracket structure 20.

The axle 14 has pivotally mounted axle ends of steering knuckles 16 and 17 which have arms 18 and 19, respectively, projecting therefrom. The arms 18 and 19 are connected by a tie-rod 21. A drag link 22 is connected to a steering arm 25 on the steering knuckle 16. Thus, when link 22 moves lengthwise, the front wheels, which are connected to the steering knuckles 16 and 17 and which are shown in broken lines at $W_1$ and $W_2$, are pivoted with respect to the axle 14. The link 22 is pivotally connected at its other end to a bar 23 which is mounted upon gear 24 and which projects radially therefrom. Gear 24 is meshed with a pinion 26 which is connected through a universal joint 27 and a steering column 28 to the steering wheel 29. Thus, arcuate movement of the steering wheel 29 will effect rotation of gear 24 and thereby lengthwise movement of link 22 to effect simultaneous pivotal movement of steering knuckles 16 and 17.

The hood 31 is comprised of an upright grill 32 which is pivotally mounted at its lower end on the forward end of the wall 12 by suitable pivot connections 33. The hood 31 has a horizontally extending top panel 34 which extends rearwardly from the upper end of the grill 32. An engine, schematically illustrated as E, is mounted, as by bolts, onto the wall 12 of the support 11 and said engine is covered in front and on top by the hood 31.

The top panel 34 of the hood 31 slopes slightly downwardly from its longitudinal center and merges with downturned corner angular faces 34a which in turn merge with and are rigidly connected to the vertical sidewalls 34b. The longitudinal bottom marginal edges of the vertical sidewalls 34b are flanged inwardly at 34c to provide spring fastening means for holding the hood in closed position. The inherent resilient nature of the metal of the hood structure is increased by the shape of the hood structure including the elongated angular areas 34a connecting the top panel 34 and the sidewalls 34b. The inturned flanges 34c are an integral part of the sidewalls 34b, the latter being of suitable material to have substantial stability and resilience so that the flanges 34c engage about projecting areas of the engine assembly and associated parts. The hood may be pivoted, or otherwise connected, at 34d to the grill 32 and may be swung independently of or with the grill, the latter having hinges 33, as heretofore described.

By providing the hood with the resilient inturned flanges 34c, no additional locks or fastening means are required, it merely being necessary to provide coacting flanges on the power plant or power plant structure with which these flanges engage.

Intermediate the power plant and the firewall is an area for housing and mounting the battery D, shown in FIGS. 7 and 8. The housing is adjacent the firewall 50 which is a wall separating the engine housing from the area occupied by an operator of the vehicle. A mounting plate 52 in the form of a horizontal shelf projects horizontally from the firewall 50 and mounted on this shelf 52 is a channel structure including a base 53, a relatively narrow leg 54 and a relatively wider leg 55, the legs 54 and 55 lying in a horizontal plane and parallel, while the base structure 53 projects upwardly and rearwardly at an angle to connect the legs 54 and 55. This provides the narrow leg for mounting on the shelf 52 and the upper relatively wider leg 55 for mounting the battery D. The angle support 53–54–55 lying on its side provides a housing area for accommodating motor accessories and other parts which is of considerable importance due to the fact that the entire assembly is extremely compact in order to function successfully in the art to which it relates.

It will be understood that the channel member, supporting the battery on one of its legs, may extend the full width of the hood structure or may be restricted in its length. The ends of the channel legs can be welded to suitable sidewalls, as indicated at 56 and 57 and where, as shown in FIG. 7, the length of the battery does not occupy the entire area of the support, the battery can be mounted at one end of the leg and clamped into position by a strap 58 and elongated bolts 59 extending through the openings in the end of the strap 58. The opposite ends 59a of the bolts 59 extend through suitable openings in the firewall 50 and the enlarged heads thereof provide anchors against the sidewall for adjustment of thumb nuts 60, whereby the strap 58 will clamp the battery and retain the same against lateral or longitudinal movement.

The compartment F is provided at the opposite side of the firewall 50 for holding switches and similar power-associated parts and indicators, such as ammeters, the latter being positioned on the downwardly tapered upper face 41 so as to be readily observable by the operator. By this construction the firewall provides one wall of the tapered compartment F. In the disclosure of FIG. 7 the cable connecting the negative post of battery D is indicated at 63, while only a fragmentary disclosure is made at 64 of the power cable to the starter or switch of the motor assembly.

By the battery mounting shown, not only is a horizontal chamber provided facing the power plant, but a passageway is provided between the firewall 50 and the angular extending base 53 for accommodating wires and the like and including wires connected to the instruments contained in compartment F.

The output shaft S of the engine is rigidly connected to a drive shaft 35 which extends through an opening in the upright wall 13, thence through a drive shaft housing 36 into the transmission and rear axle housing 37. The drive shaft housing 36 is of strong and sturdy construction, preferably a cast iron casting, and it is flanged at its ends and said flanges are fixedly secured to the engine support 11 and to the tarnsmission and rear axle housing 37 by bolts or the like. It is to be noted that due to the rigid construction of the housing 36, the connection from the drive shaft S to the input of the transmission is a rigid connection and no universal joints are used.

Two shafts 171 and 172 are arranged parallel with shaft 163 and in axially aligned, end-butting-end relationship. A differential housing 173 surrounds the adjacent ends of the shafts 171 and 172 and is rotatably supported thereon. The housing 173 has a pair of drive gears 174 and 176 on its periphery which alternately mesh with the gears 168 and 169, respectively, in response to the axial position of the sleeve 164. The differential housing has a central chamber 177 surrounding the abutting ends of shafts 171 and 172. A pair of identical gears 178 and 179 are fixedly mounted on shafts 171 and 172 close to their abutting ends and these gears are received in chamber 177. A pair of circumferentially spaced pins, of which one appears at 181, extend through the chamber 177 and parallel with shafts 171 and 172. The pins 181 each carry a gear 182 which meshes with gear 178. A similar pair of circumferentially spaced pins, of which one appears at 183, carry gears 184 which mesh with another appropriate gear.

The two shafts 171 and 172 are independently braked by brake units 186 and 187 which are identical. Referring to brake unit 186, the shaft 171 extends through the sidewall of the housing 37 and it has a drum secured thereto and located outside of said housing. The drum is encircled by a suitable friction band around the major portion of its periphery. The shafts 171 and 172 have relatively small gears 201 and 202, respectively, secured thereto adjacent the sidewalls of the housing. The gears 201 and 202 mesh, respectively, with relatively large gears 203 and 204 which are secured to drive axles 206 and 207. The axles 206 and 207 are enclosed by housings 208 and 209, which housings are secured, as by bolting, to the sidewalls of the housing 37. The axles 206 and 207 are rotatably supported at one end thereof by bearings 210 and 211 in the sidewalls of housing 37. The outer ends of axles 206 and 207 are supported by bushings at the outer end of housing 208 and 209, one of said bushings appearing at 212. Wheel connecting structures, one of which is shown at 213, are secured to the outer ends of the axles 206 and 207 and are secured to the drive wheels $W_3$ and $W_4$ of the tractor.

A driver's seat S is mounted on an arm 216 which is pivotally mounted upon the upper wall of housing 37 adjacent the forward end thereof. A cushioning device 218 is secured to the seat and extends downwardly therefrom for engagement with the upper wall of the housing. A pair of foot rests, of which one appears at 219, are secured to the support 11 on either side of the drive shaft housing 36 at a convenient distance from the driver's seat to enable the driver to rest his feet thereon.

Thus, the tractor 10 is comprised of strong and durable parts and power is transmitted from the engine by a gear type drive to the driving wheels $W_3$ and $W_4$. The three speed transmission may be shifted by manipulation of the lever 101. Lever 62a can be manually operated to provide operation of the power take-off when desired. Lever 166 can be manually operated to provide low-speed, neutral or high speed setting of the rear axle. By depression of lever 194 or the corresponding lever on the other side of housing 37, transmission of power to wheels $W_3$ and $W_4$ can be individually stopped as desired to assist in maneuvering the tractor. The tractor is steered by the operator in the usual manner.

The housing 37 contains a three speed transmission and a two speed rear axle connected in series with said transmission. Thus, the power train provides six speeds, four speeds forward and two speeds reverse. The specific transmission forms no part of the instant invention but includes appropriate power driving means and desirable power take-offs, such as shown at 61a and 61b. Suitable manual means, such as lever 62a may be provided so that by manipulating this lever, the operator can turn the power off and on to the take-off shafts. The same is true with respect to the manipulation of other controlled parts of the tractor, such as lever 101 which extends upwardly adjacent to seat S occupied by the operator.

What is claimed is:

1. In a garden tractor assembly including a body and an engine compartment forwardly of the body, a firewall assembly between the engine compartment and the body, a battery mounting member adjacent the firewall assembly including a transversely extending channel member having a wide flange and a relatively narrow flange connected by an angular base member, the wide flange being positioned upwardly to provide a supporting area for mounting a battery and the relatively narrow flange forming a mounting, said channel member having its base extending upwardly away from the engine compartment with the open face of the channel facing the engine compartment to form an accessory compartment opening into the engine compartment, the area rearward of the angular base of said channel forming a passageway spaced from the engine compartment, and supporting means for said channel member.

2. The structure of claim 1 characterized in that end walls project upwardly from the ends of the wide flange of the channel to partially define an enclosure, and spaced removable anchored bolts extend parallel to said end walls for engaging a clamp member for securing a battery against displacement when the battery is mounted on the wide flange.

3. The structure of claim 1 characterized in that a hood member is pivoted at the forward end of the engine compartment, said hood member including spring sidewalls with inturned flanges which resiliently engage fixed projections to lock the same in closed position, the hood member extending rearwardly to overlie the wide flange to provide a cover for the battery mounted thereon.

4. The structure of claim 1 characterized in that a switch box is mounted rearward of the firewall and adjacent the battery mounting member for enclosing electrical equipment connected with the battery.

5. In a tractor assembly including a body and an engine compartment forwardly of the body, a firewall assembly between the engine compartment and the body, a channel member including a short flange and a long flange connected by an angular base, said channel member lying on its side with its open face turned inwardly towards the engine compartment and mounted adjacent the firewall, means for clamping a battery in position on the uppermost of said flanges, upright walls at the end of the battery mount to define the end walls of a battery compartment, and a hood for the engine compartment mounted at one end for pivotal movement away from the engine compartment, said hood extending over the battery mount to provide a cover therefor and inturned spring urged flanges carried by the hood for securing same against displacement when in its lowered position.

References Cited

UNITED STATES PATENTS

| | | | |
|---|---|---|---|
| 2,155,941 | 4/1939 | Jaskey | 180—68.5 |
| 2,196,578 | 4/1940 | Greig | 180—68.5 |
| 2,206,306 | 7/1940 | Sager | 180—68.5 |
| 2,304,365 | 12/1942 | McCormick. | |
| 2,488,360 | 11/1949 | Williams | 180—68.5 |

LEO FRIAGLIA, *Primary Examiner.*

MILTON L. SMITH, *Assistant Examiner.*